(12) United States Patent
Mekimah

(10) Patent No.: US 9,912,147 B2
(45) Date of Patent: Mar. 6, 2018

(54) INTERFACE HAVING EARTH FAULT CURRENT

(71) Applicant: Djamel Mekimah, Skikda (DZ)

(72) Inventor: Djamel Mekimah, Skikda (DZ)

( * ) Notice: Subject to any disclaimer, the term of this patent is extended or adjusted under 35 U.S.C. 154(b) by 288 days.

(21) Appl. No.: 14/650,492

(22) PCT Filed: Nov. 7, 2013

(86) PCT No.: PCT/DZ2013/000006
§ 371 (c)(1),
(2) Date: Sep. 3, 2015

(87) PCT Pub. No.: WO2014/086378
PCT Pub. Date: Jun. 12, 2014

(65) Prior Publication Data
US 2016/0006239 A1    Jan. 7, 2016

(30) Foreign Application Priority Data

Dec. 9, 2012    (DZ) .......................... 120838

(51) Int. Cl.
*H02H 3/00* (2006.01)
*H02H 9/02* (2006.01)
(Continued)

(52) U.S. Cl.
CPC ............ *H02H 9/02* (2013.01); *H02H 3/33* (2013.01); *H02H 3/335* (2013.01); *H02H 5/12* (2013.01); *H02H 3/162* (2013.01); *H02H 3/44* (2013.01)

(58) Field of Classification Search
USPC .................................................. 361/42–50
See application file for complete search history.

(56) References Cited

U.S. PATENT DOCUMENTS 3,976,918 A    8/1976    Clark
4,138,707 A    2/1979    Gross
(Continued)

FOREIGN PATENT DOCUMENTS

FR    2 454 198 A2    11/1980
FR    2 538 179 A1    6/1984
WO    03/001641 A2    1/2003

OTHER PUBLICATIONS

International Search Report, dated Mar. 24, 2014, from corresponding PCT application.
(Continued)

*Primary Examiner* — Danny Nguyen
(74) *Attorney, Agent, or Firm* — Young & Thompson

(57) ABSTRACT

An interface for cutting off the power supply for any fault current Id≤300 milliamperes such that: Id≥IPE+k·Ih where IPE represents the current returning to the power source via the protective conductor connecting the exposed conductive parts to earth and Ih (≤10 or 30 milliamperes) represents the current returning to the power source by ways other than via the protective conductor or via an active conductor. Current Ih is therefore likely to travel through a person. In this way, the interface protects people and property against ground insulation faults and against certain direct contacts independently of the earth of the exposed conductive parts and of external conditions. It also protects people in the event of a failure in the protection of an area using the same earth in case of a fault.

20 Claims, 2 Drawing Sheets

(51) Int. Cl.
*H02H 3/33* (2006.01)
*H02H 5/12* (2006.01)
H02H 3/44 (2006.01)
H02H 3/16 (2006.01)

(56) References Cited

U.S. PATENT DOCUMENTS

| | | | |
|---|---|---|---|
| 4,318,151 A * | 3/1982 | Balchin | H02H 3/33 361/45 |
| 6,650,523 B1 | 11/2003 | Kleemeier et al. | |
| 2010/0308943 A1 | 12/2010 | Dobusch | |

OTHER PUBLICATIONS

European Search Report issued in Application No. 13859684.6, dated Aug. 3, 2016.
Australian Search Report issued in Application No. 2013354545, dated Nov. 28, 2016.

* cited by examiner

INTERFACE HAVING EARTH FAULT CURRENT

TECHNICAL FIELD TO WHICH THE INVENTION RELATES

The present invention relates to the field of disconnection devices making it possible to provide the protection of property against fire and that of persons against indirect contacts in case of electrical insulation faults of the exposed-conductive-part at Low Voltage.

The invention concerns an earth fault current interface; it thereby makes it possible, in case of exposed-conductive-part insulation fault, to provide the protection of property against fire and that of persons against indirect contacts in accordance with the conventional safety curves whatever the value of the earth resistance of the exposed-conductive-parts and whatever the environment (dry, wet, immersed) and the conditions of the skin.

Thus, the earth electrode of the exposed-conductive-parts will no longer necessarily represent a link in the protective chain, but a means of comfort given that an increase in its impedance will result in an increase in the sensitivity of the differential device, the safety of persons and property still being ensured in this case.

The invention also makes it possible to provide the protection of persons against direct contacts occurring between a line conductor and the floor or any foreign conductor not linked to the exposed-conductive-parts of the equipment normally connected to earth in accordance with the implementation requirements of the invention.

STATE OF THE PRIOR ART

I/ Provisions of Protection Standards

Internationally, for Low Voltage electrical distribution, three earthing systems (ESs) are covered by standards:
  TN: Neutral connection with three versions (TN-C; TN-S; TN-C-S);
  TT: Neutral to earth;
  IT: Insulated neutral.

In the standard IEC 60364-4-41 of December 2005 (in force), the technical committee 64 of the International Electrotechnical Commission set out three fundamental requirements common to the three ESs for the protection of persons in case of ground insulation faults.

These requirements are the following:
1—Earthing and protective equipotential bonding;
2—Automatic disconnection of the supply in case of (insulation) fault in a time compatible with the conventional safety curves;
3—Implementation of additional protection in certain conditions of external influence and for certain locations (IEC 60364 standard "Requirements for special installations or locations").

The choice of the devices for supply disconnection in case of exposed-conductive-part insulation fault is made according to the earthing system considered.

II/ Differential Protection and its Limits

Although the effectiveness of differential devices for protection against the risks of fire is undeniable, their implementation for the protection of persons against electric shocks and case of fault has shown its limits.

To be precise, in a protection system, the differential function is only one link in the "protective chain". In case of insulation fault, in the TT and IT systems, between a live component and an earthed exposed-conductive-part, the differential device only ensures the safety of persons against indirect contacts if the following protection condition is met: $R_A \times I_a \leq 50$ Volts; Wherein: $R_A$ is the sum of the resistances of the earth electrode and of the earthing conductors for earthing the exposed-conductive-parts and $I_a$ is the current providing the automatic disconnection of the differential protection device in a time compatible with the conventional safety curves.

In this standard-based requirement from part 4-41 of standard IEC 60364, it should be noted that:
  This condition only applies in collective buildings, where, despite complying with $R_A$, fault currents, less than $I_a$, occurring simultaneously at two or several accommodations may, added together, create a dangerous contact voltage at all the exposed-conductive-parts of the building on account of the equipotential bonding of those exposed-conductive-parts.
  The condition $U_L \leq 50$ V is valid only in a dry environment;
  The resistance of the of the earth electrode of the exposed-conductive-parts must be appropriate and maintained over time;
  The continuity of the earthing conductors of the exposed-conductive-parts must be ensured.

These constraints have led the technical committee 64 of the International Electrotechnical Commission to allow the use of residual current devices (RCDs), of which the nominal operating current is less than or equal to 30 milliamps, as an additional protective measure against indirect contacts in certain situations cited in particular in Part 7 of the standard IEC 60364.

Currently, in most European countries, this protective measure is extended to all supply circuits, whatever the earthing system.

The technical committee 64 of the IEC however does not recognize the use of such devices as a constituent, per se, of a full protective measure and advocates conformity of installations with the fundamental standard-based requirements common to the three ESs for protection in case of exposed-conductive-part insulation fault, in particular those requirements relative to the earthing, to protective equipotential bonding and to the disconnection of the supply.

To properly situate the problem of protecting persons against electric shocks in case of exposed-conductive-part insulation fault, responses should be found to two questions:
1. Why has the technical committee 64 of the IEC considered that the additional protection (by high sensitivity RCD) is insufficient per se and why does it require it to be associated with an earth electrode for the exposed-conductive-parts and protective equipotential bonding with a device for disconnection in case of fault?

As specified in Article 314-1 of the standard IEC 60364-1 of November 2005 (in force), the additional protective measure requires the division of the installations to reduce the possibility of undesirable tripping of the high-sensitivity differential devices due to excessive leakage currents (and not fault currents) in the protective conductor PE.

In case of inadequacy of the earth electrode for the exposed-conductive-parts, of its absence or of rupture of the protective conductor, these excessive leakage currents may present a risk of receiving an electric shock or even of electrocution for any person in contact with an exposed-conductive-part and the floor or with an exposed-conductive-part and a foreign conductor not insulated from the earth.

Furthermore, in the accommodations in a collective building, it should be considered that the danger is increased given the fact that, in addition to the risk generated by the leakage currents from their own installations, persons may be exposed to electric shock, or even electrocuted, by leakage currents which do not even come from their own supplies, this being on account of the equipotentiality of the exposed-conductive-parts of the accommodations in the building.

This situation may occur not only in the TT and TN systems but also in the IT system (if two faults occur in two exposed-conductive-parts connected to two distinct earth electrodes).

In this context, attention is drawn to this risk in the Article 531.2.1.5 of the standard IEC 60364-5-53 where it is stated that "the use of RCDs have a differential residual current less than or equal to 30 mA in installations lacking a protective conductor must not be considered as a sufficient protective measure against indirect contacts."

We are thus able to confirm that this protective measure is not sufficient per se and that the first fundamental requirement for earthing and for protective equipotential bonding with a device for disconnection in case of fault prescribed by the standard IEC 60364-4-41 is imperative for the protection of persons against indirect contacts.

2. Does the implementation of the current standard-based protective measures in accommodations in collective buildings always ensure the protection of persons in case of exposed-conductive-part insulation fault?

In case of malfunction of the protection of a neighborhood in the presence of an insulation fault, the exposed-conductive-parts of the entire building may be brought to a dangerous potential on account of their interconnection.

In this scenario, the additional equipotential bonding (A.E.B.) also participates in propagating that potential in case of a conductive floor.

Thus, as the current standard-based protective measures offer nothing to counter such a situation, it should be considered that persons may be exposed to electric shock, or even be electrocuted, by a current which does not even come from their own power supplies.

III/ Constraints Generated by the Division of the Installations in the Use of High-Sensitivity Differential-Residual Current Devices (Less than or Equal to 30 Milliamps)

Although the division of the installations may be imposed to reduce the possibility of tripping high-sensitivity RCDs due to excessive leakage currents in the protective conductor [PE], this has not been without the generation of new constraints of which the following may be cited:
- The necessity to use several high-sensitivity RCDs which generally requires new electrical installations in the existing home;
- Undesirable tripping due to faults less than or equal to 30 milliamps running to earth via the protective conductor and, therefore, presenting no risk to persons or property;
- the horizontal selectivity generally used may be found wanting by the phenomenon of "sympathetic tripping". This situation is generally observed on opening a protection of a parallel start which creates a phenomenon of excessive voltage. This transient excessive voltage may give rise to the opening of a healthy start comprising filter capacitances connected to the earth for the exposed-conductive-parts via the PE. The use of an RCD with strengthened immunity is necessary in such a case.

OBJECT OF THE INVENTION

The invention is directed to improving the protection of persons and property against electrical insulation faults of the exposed-conductive-parts at Low Voltage.

The invention consists of an electromagnetic interface able to be integrated into high sensitivity differential devices which is directed to:

1/—ensuring fire protection by disconnecting the electrical supply as soon as a fault current less than or equal to 300 milliamps (according to the standard-based requirements) returns to the supply source through the protective conductor connected to the earth for the exposed-conductive-parts; below, this current will be designated by $I_{PE}$.

2/—ensuring the protection of persons by disconnecting the electrical supply as soon as a fault current less than or equal to 10 or 30 milliamps (according to the envisioned protection) returns to the supply source other than by the protective conductor [PE] or by a line conductor of the supply serving the installation considered. This current is, therefore, considered as capable of passing through a person; below, it will be designated by $I_h$.

3/—disconnecting the electrical supply on the appearance of a composite residual fault current $I_d$ such that: $I_d \geq I_{PE} + k \times I_h$. With $I_d \leq 300$ milliamps; $I_{PE} \leq 300$ milliamps; $I_h \leq 30$ milliamps if k=10; $I_h \leq 10$ milliamps if k=30.

4/—ensuring the protection of persons in accommodations in a collective building in case of malfunctioning of the protection of a neighborhood in the presence of a dangerous insulation fault.

This insulation fault may, indeed, create a dangerous voltage between all the exposed-conductive-parts of the building (on account of their interconnection) and the floor or any conductive member foreign to the installation.

In this scenario, the protection is ensured by the addition of a pole in the disconnection and protection device. This pole will serve to insulate the exposed-conductive-parts of the main protection further to the tripping of the disconnection and protection device.

This tripping is induced by any current less than or equal to 10 or (30) milliamps (according to the protection envisioned) capable of passing through a person in contact with an exposed-conductive-part and the ground and any conductor enabling the current to return to the supply source.

This protection requires the accessible conductor components (other than the exposed-conductive-parts) of the protected accommodation to be insulated from those of the other accommodations.

This insulation is achieved in fact, in particular, by the progressive use of pipes of plastic (polyethylene) in the water circuits and the use of dielectric insulating connectors for gas pipes.

5/—transforming the earth electrode for the exposed-conductive-parts into a link in the comfort chain instead of a link in the protection chain because the protection of persons against indirect contacts is ensured whatever the ohmic resistance of the earth for the exposed-conductive-parts and independently of the environment (dry, humid, immersed) and the skin conditions.

6/—giving a reliable and long-term means of protection on account of its purely electromagnetic design.

Note: The earth fault current interface integrates in the bipolar differential devices used in single phase installations as well as in multipolar ones used in multi-phase installations.

Figures 2, 3:
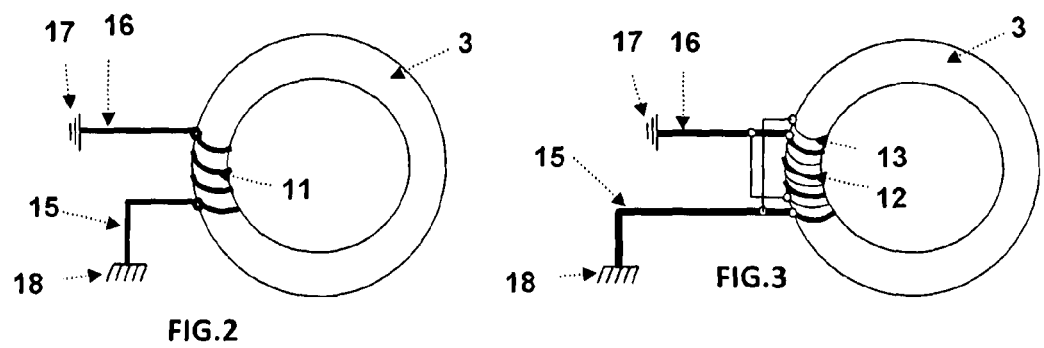

FIG. 2 represents the first variant of said interface consisting of a desensitization winding (11) of which the number of turns is different from that of the primary windings (4) of the live and (5) of the neutral of the high sensitivity differential device.

FIG. 3 represents the second variant of said interface consisting of a desensitization winding composed of two coils (12) and (13) formed from conductor wires of different cross-section of which the magnetic polarities are reversed (opposite direction of coiling) and of which the number of turns of each is equal to that of the primary winding (4) of the live or that (5) of the neutral of the high sensitivity differential device. The electromagnetic fields of these two coils subtract from each other.

Figure 4:
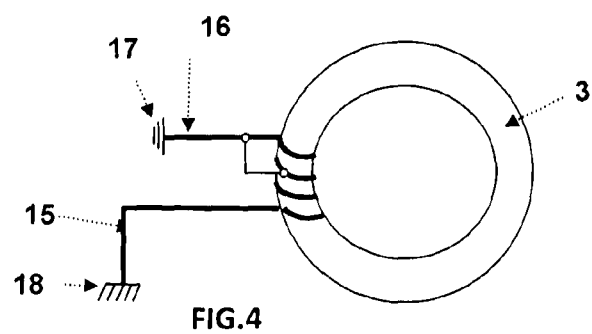

FIG. 4 represents the third variant of the interface (10) consisting of a desensitization winding (14) identical to the primary winding (4) of the phase and that (5) of the neutral of the high sensitivity differential device but from which it differs by the shunt of some of its turns.

Figure 5:
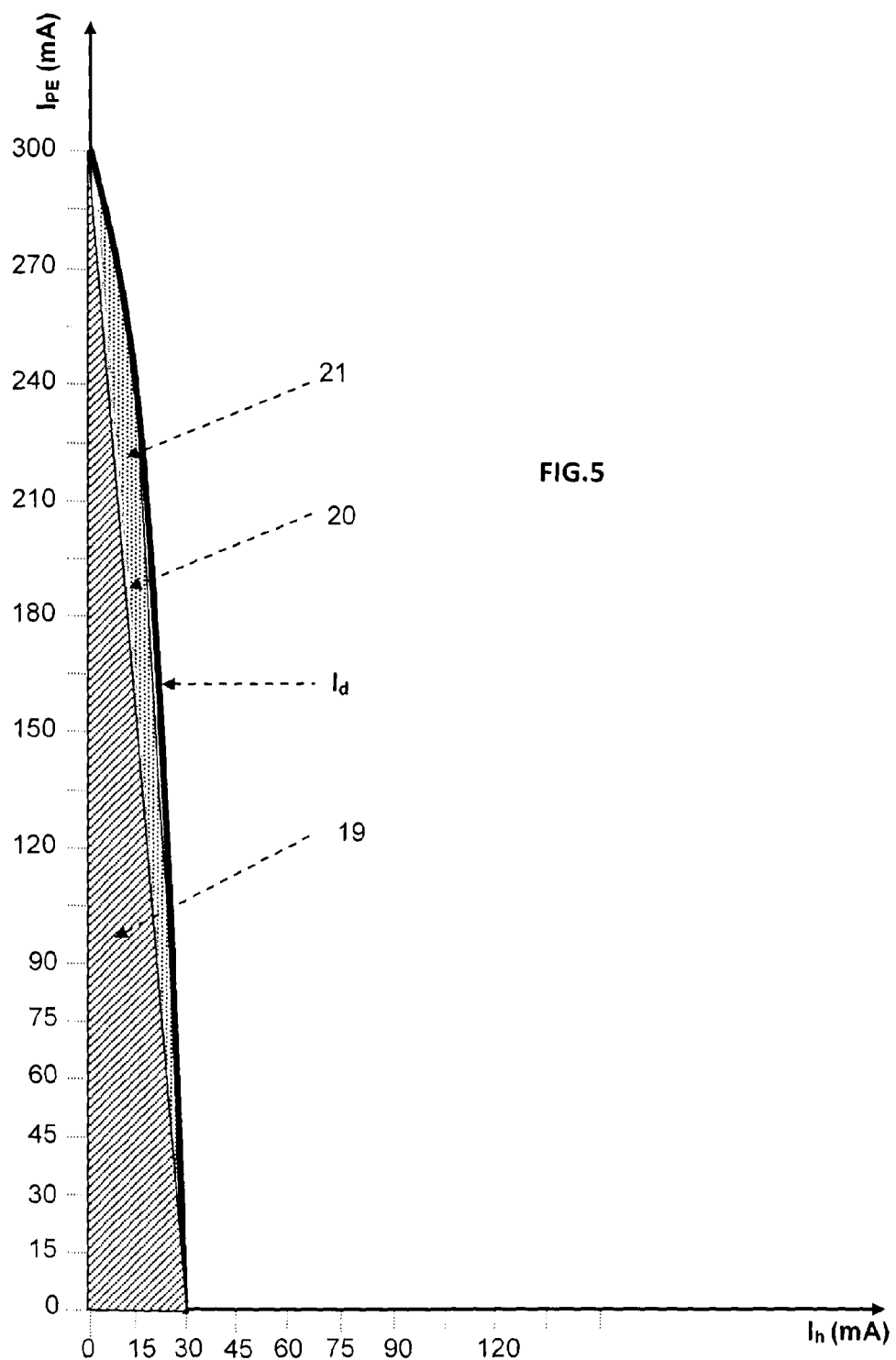

FIG. 5 represents the response curve of the disconnection system obtained by integration of said interface in a 30 mA high sensitivity differential device.

PRESENTATION OF THE ESSENCE OF THE INVENTION

Figure 1:
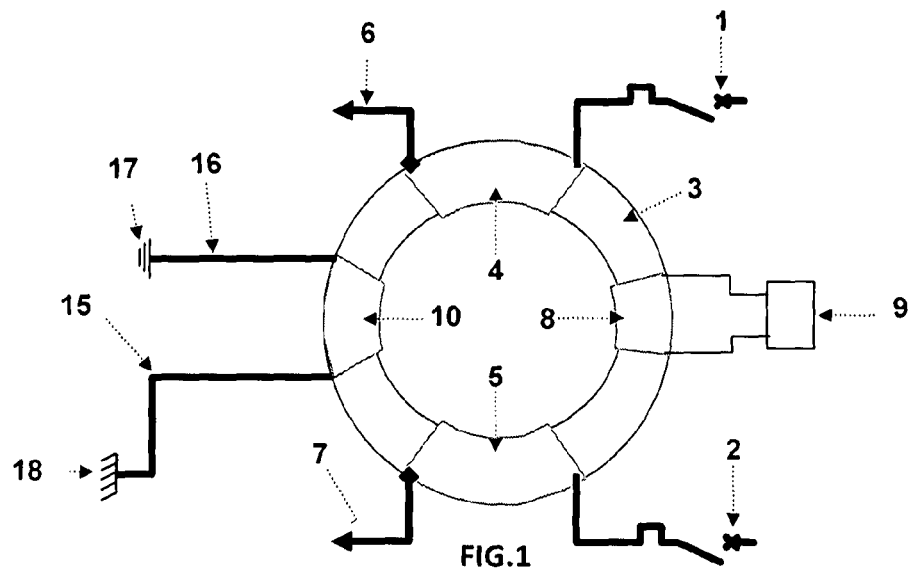
FIG. 1 represents the connection mode of the disconnection system obtained by integration of the earth fault current interface (10) in a high sensitivity differential device.

In any case, the invention will be well-understood with the help of the following description: With reference to FIG. 1, the high sensitivity differential device is composed, initially, of power contacts (1) and (2) connected to the primary windings (4) and (5), of the magnetic toroid (3), of the primary windings (4) and (5) and their outputs 6) and (7) as well as of the secondary winding (8) and of the tripping relay (9).

With the integration of the interface, which consists of a desensitization winding (10), the high sensitivity differential device transforms into a protection device of which the operating characteristics are represented in FIG. 5.

Thus, if with reference to FIG. 1 and to FIG. 5, it is considered that $I_d$ represents the residual differential current (in milliamps) composed by the algebraic sum of the currents $I_h$ (mA) and $I_{PE}$ (mA) wherein:

$I_{PE}$ (mA) represents the current generated by an insulation fault and returning to the supply source through the desensitization winding;

$I_h$ (mA) represents the current capable of passing through a person in the fault conditions described in 1— and 3— below; the protection apparatus makes it possible to:

1—provide the protection of persons by using the initial properties of the high sensitivity differential device.

The device thus provides the protection of persons by disconnecting the supply in the presence of any current $I_h$ less than or equal to 10 (or 30) milliamps (according to the protection envisioned) coming from one of the outputs (6) or (7) of the primary windings and returning to the supply source other than by the protective conductor (16) or by one of the outputs (6) and (7) of the primary windings. This current is, therefore, considered as capable of passing through a person.

The protection of persons is thus provided:
against indirect contacts whatever the value of the resistance of the earth for the exposed-conductive-parts and whatever the environment (dry, humid, immersed) and the skin conditions.
against direct contacts occurring between any line conductor and any exposed-conductive-part or any conductor foreign to the installation enabling the return of the fault current to the supply source other than by the protective conductor (16) or by one of the outputs (6) and (7) of the primary windings.

2—provide fire protection by disconnecting the supply in the presence of any current $I_{PE}$ less than or equal to 300 milliamps (according to the standard-based requirements) generated by an exposed-conductive-part (18) insulation fault and returning to the supply source via said desensitization winding (10) which is connected to the exposed-conductive-part (18) by the protective conductor (15) and is also connected to the earth electrode (17) for the exposed-conductive-parts by the protective conductor (16). Fire protection is thus provided.

3—Provide the protection of persons and that of property by transforming the earth electrode for the exposed-conductive-parts into a link of the comfort chain instead of a link of the protective chain.

More particularly, in accordance with the operating characteristics of FIG. 5, and independently of the conditions for establishment of an insulation fault, the interface enables the protective apparatus to ensure the safety of persons and property by disconnecting the supply in the presence of any compound residual current such that:

$$I_d \geq I_{PE} + k \times I_h \quad (1);$$

With: $-I_d \leq 300$ milliamps; $I_{PE} \leq 300$ milliamps;
$I_h \leq 30$ milliamps if k=10; $I_h \leq 10$ milliamps if k=30

Thus, if, in formula (1) (representing the curve $I_d$), the current $I_h$ (capable of passing through a person) predominates (which results in the tripping of the high sensitivity protective apparatus); this is due:

a—either to the contact of a person with an exposed-conductive-part having a fault in conditions of dry skin, in a dry environment but in the presence of a high value of the earth electrode for the exposed-conductive-parts, of its absence or of the rupture of the protective conductor;

b—or to the contact of a person with an exposed-conductive-part having a fault in conditions of humidity or immersion in the presence of a normal value for the earth electrode for the exposed-conductive-parts;

c—or to the contact of a person with line conductor and any exposed-conductive-part or any conductor foreign to the installation enabling the return of the fault current to the supply source other than by the protective conductor (16) or by one of the outputs (6) or (7) of the primary windings.

d—or to the contact of a person with an exposed-conductive-part in case of malfunction of the protection of a neighborhood in the presence of a dangerous insulation fault (case of the accommodations in a collective building). This case is set out in the part "object of the invention".

Thus, with the implementation of the interface, the faultiness of the earth electrode for the exposed-conductive-parts or the rupture of the protective conductor only affects the comfort chain, the protection of persons and property remains provided in these scenarios.

With reference to FIG. 5, the zone of "operation or non-operation" of the usual differential devices is considered as "zone of non-operation".

Thus, with reference to FIG. 5, it should be noted that:
the zone (19) is that of the non-operation of the protective apparatus;
the curve (20) represents the linear function:

$$I_{PE} = 300 - 10 \times I_h; \; (I_h \text{ varying from 0 to 30 mA});$$

the zone (21) is that of the operation or non-operation of the protective apparatus;

the curve $I_d$ represents the operating differential current assigned for the protective device.

EMBODIMENT OF THE INVENTION

With reference to FIG. 1, the interface consists of a desensitization winding (10). Said desensitization winding may be made based on, at least, three variants represented in FIGS. 2, 3 and 4.

In the embodiment represented in FIG. 2, and corresponding to the first variant, the interface consists of a desensitization winding (11).

This variant makes it possible to desensitize the high sensitivity differential device for any fault current returning to the supply source through the protective conductor (16) connected to the earth electrode (17) for the exposed-conductive-parts.

This desensitization is performed in a proportion P such that:

$$P=N2 \div N1 \text{ if } N2<N1 \text{ or } P=N1 \div N2 \text{ if } N1<N2 \text{ In which:}$$

N1 is the number of turns of the primary winding of the live or neutral of the high sensitivity differential device;
N2 is the number of turns of the desensitization winding.

If, for example, the interface is integrated into a differential device of which the sensitivity is 30 milliamps, the fire protection ($I_{PE} \leq 300$ milliamps), is provided for: 30 mA=300 mA×(1−P) i.e. P=0.9; as the desensitization is made at 90%, it is necessary for N2=0 0.9×N1 or for N1=0.9×N2.

In the embodiment represented in FIG. 3 which corresponds to the second variant, the interface consists of a desensitization winding composed of two coils (12) and (13), formed from conductor wires of different cross-sections, of which the magnetic polarities are reversed (opposite direction of coiling) and of which the number of turns of each is equal to that of the primary winding of the live (4) or that of the neutral (5) of the high sensitivity differential device.

This variant makes it possible to desensitize the high sensitivity differential device for any fault current returning to the supply source through the protective conductor (16) connected to the earth electrode (17) for the exposed-conductive-parts.

This desensitization is performed in a proportion P such that:

$$P=(S1-S2) \div (S1+S2) \text{ wherein } S1>S2; \text{ in which:}$$

S1 is the cross-section of the conductor wire of the desensitization coil of which the magnetic polarity is in the same sense as that of the primary winding of the live or of that of the neutral of the high sensitivity differential device;
S2 is the cross-section of the conductor wire of the desensitization coil of opposite magnetic polarity to that of the primary winding of the live or of that of the neutral of the high sensitivity differential device;

If, for example, the interface is integrated into a differential device of which the sensitivity is 30 milliamps, the fire protection ($I_{PE} \leq 300$ milliamps), is ensured for:

$$30 \text{ mA}=300 \text{ mA}\times(1-P) \text{ i.e. } P=0.9$$

As the desensitization is carried out at 90%, it is necessary that:

$$S1-S2=0.9\times(S1+S2) \text{ which gives:} S1=19\times S2$$

In the embodiment represented in FIG. 4, and corresponding to the third variant, the interface consists of a desensitization winding (14), that is identical to those of the live and the neutral of the high sensitivity differential device, but of which some of the turns are shunted.

This variant makes it possible to desensitize the high sensitivity differential device for any fault current returning to the supply source through the protective conductor (16) connected to the earth electrode (17) for the exposed-conductive-parts.

This desensitization is performed in a proportion P such that:

$$P=[N2\times(1-z)] \div N2$$

In which: —N2 is the number of turns of the desensitization winding;
z is the coefficient which depends on the quantity of shunted turns and on the specificities of the shunt.

If the interface is integrated into a differential device of which the sensitivity is 30 milliamps, the fire protection ($I_{PE} \leq 300$ milliamps), is ensured for:

$$30 \text{ mA}=300 \text{ mA}\times(1-P) \text{ i.e. } P=0.9$$

As the desensitization is carried out at 90%, it is necessary that:

$$N2(1-z)=0.9\times N2 \text{ or that } z=0.1.$$

The invention claimed is:

1. An earth fault current interface disposed between exposed-conductive-parts (18) and earth (17) for the exposed-conductive-parts via protective conductors (15) and (16), and characterized in that the interface actuates opening of power contacts (1) and (2) of a high sensitivity differential device via a tripping relay (9) supplied by a secondary winding (8) for any fault residual current $I_d$ less than or equal to 300 milliamps if a fire protection is detected and able to be greater than 300 milliamps if the fire protection is not detected and such that $I_d \geq I_{PE}+k\times I_h$ with $I_d=I_{PEmax}$ if $I_h=0$ and $I_d=k\times I_{hmax}$ if $I_{PE}=0$, $I_{PE}$ representing a fault current returning to a supply source via the protective conductors (15) and (16) of which the value must be less than or equal to 300 milliamps if the fire protection is detected and is greater than 300 milliamps if the fire protection is not detected, $I_h$ representing any fault current returning to the supply source other than by the protective conductors (15) and (16) or by a line conductor (6) or (7) of the supply of which the value must be less than or equal to 30 milliamps according to the current for protecting persons detected and k representing a coefficient such that $k=I_{PEmax} \div I_{hmax}$.

2. The earth fault current interface according to claim 1, characterized in that the interface is integrated into the high sensitivity differential device, for said high sensitivity differential device to be a high sensitivity differential circuit breaker or a high sensitivity differential switch of which an assigned operating differential current is equal to 30 milliamps.

3. The earth fault current interface according to claim 1, characterized in that the interface is constituted by one or more desensitization windings, formed around a magnetic torus (3) of the high sensitivity differential device.

4. The earth fault current interface according to claim 1, characterized in that the interface actuates the opening of the power contacts (1) and (2) of the high sensitivity differential device, via the tripping relay (9) supplied by the secondary winding (8) for any residual fault current $I_d$ less than or equal to 300 milliamps and such that: $I_d \geq I_{PE}+10\times I_h$.

5. The earth fault current interface according to claim 1, characterized in that the current $I_{PE}$ representing the fault current returning to the supply source via the protective conductors (15) and (16) is less than or equal to 300 milliamps.

6. The earth fault current interface according to claim 1, characterized in that the current $I_h$ representing the fault current returning to the supply source other than by the protective conductors (15) and (16) or by the line conductor (6) or (7) of the supply is less than or equal to 30 milliamps.

7. The earth fault current interface according to claim 1, characterized in that the coefficient k is equal to 10.

8. The earth fault current interface according to claim 1, characterized in that a first variant of said interface is constituted by a desensitization winding (11) having a number of turns N2 different from a number of turns N1 of a primary winding (4) of a live component of the high sensitivity differential device, in a proportion P such that P=N2÷N1=0.9 if N2<N1 or P=N1÷N2=0.9 if N1<N2.

9. The earth fault current interface according to claim 1, characterized in that a second variant of said interface is constituted by a desensitization winding composed of two coils (12) of which a cross-section is S1 and (13) of which a cross-section is S2, coupled in parallel and wound in opposite directions relative to each other; each of these two coils having a number of turns equal to that of a primary winding (4) of a live component of the high sensitivity differential device, these two coils having cross-sections S1 and S2 in a proportion P such that: P=(S1−S2)÷(S1+S2)=0.9 with: S1>S2.

10. The earth fault current interface according to claim 1, characterized in that a third variant of said interface is constituted by a desensitization winding (14) having a number of turns N2 identical to that of a primary winding (4) of a live component of the high sensitivity differential device, some of the number of turns N2 being shunted, this shunting serving to desensitize the high sensitivity differential device in a proportion P such that P=[N2×(1−z)]÷N2=0.9 which means that z=0.1 that is to say that one tenth of the turns N2 is shunted.

11. The earth fault current interface according to claim 3, characterized in that a cross-section of the desensitization winding or a sum of cross-sections of the desensitization windings must be at least equal to that of a primary winding (4) of a live component of the high sensitivity differential device used.

12. The earth fault current interface according to claim 2, characterized in that the high sensitivity differential device used is multipolar.

13. The earth fault current interface according to claim 1, characterized in that the interface provides protection, in case of exposed-conductive-part insulation fault, of property against fire.

14. The earth fault current interface according to claim 1, characterized in that the interface provides protection of persons against electric shocks in case of contact between an exposed-conductive-part at fault and the ground; between an exposed-conductive-part at fault and any conductor component foreign to an installation as well as between any line conductor and the ground and between any line conductor and any component foreign to the installation.

15. The earth fault current interface according to claim 1, characterized in that the interface provides protection for persons against contacts with an exposed-conductive-part in case of malfunction of the protection of a neighborhood using the same electrode for the exposed conductive parts; and the use of an additional pole at the high sensitivity differential circuit-breaker or high sensitivity differential switch used thus enabling galvanic separation of the exposed-conductive-parts of an installation protected by the interface relative to the exposed-conductive-parts of the neighborhood at fault.

16. The earth fault current interface according to claim 2, characterized in that the interface is constituted by one or plural desensitization windings, formed around a magnetic torus (3) of the high sensitivity differential device.

17. The earth fault current interface according to claim 4, characterized in that the current $I_{PE}$ representing the fault current returning to the supply source via the protective conductors (15) and (16) is less than or equal to 300 milliamps.

18. The earth fault current interface according to claim 3, characterized in that a first variant of said interface is constituted by a desensitization winding (11) having a number of turns N2 different from a number of turns N1 of a primary winding (4) of a live component of the high sensitivity differential device, in a proportion P such that P=N2÷N1=0.9 if N2<N1 or P=N1÷N2=0.9 if N1<N2.

19. The earth fault current interface according to claim 3, characterized in that a second variant of said interface is constituted by a desensitization winding composed of two coils (12) of which a cross-section is S1 and (13) of which a cross-section is S2, coupled in parallel and wound in opposite directions relative to each other; each of these two coils having a number of turns equal to that of a primary winding (4) of a live component of the high sensitivity differential device, these two coils having cross-sections S1 and S2 in a proportion P such that: P=(S1−S2)÷(S1+S2)=0.9 with: S1>S2.

20. The earth fault current interface according to claim 3, characterized in that a third variant of said interface is constituted by a desensitization winding (14) having a number of turns N2 identical to that of a primary winding (4) of a live component of the high sensitivity differential device, some of the number of turns N2 being shunted, this shunting serving to desensitize the high sensitivity differential device in a proportion P such that P=[N2×(1−z)]÷N2=0.9 which means that z=0.1 that is to say that one tenth of the turns N2 is shunted.

* * * * *